United States Patent
Gohil (10) Patent No.: US 8,273,850 B2
(45) Date of Patent: Sep. 25, 2012

(54) POLYESTER COMPOSITIONS FROM BIOLOGICALLY-DERIVED MATERIALS

(75) Inventor: Rameshchandra M. Gohil, Newark, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 310 days.

(21) Appl. No.: 12/631,879

(22) Filed: Dec. 7, 2009

(65) Prior Publication Data
US 2010/0151167 A1    Jun. 17, 2010

Related U.S. Application Data

(60) Provisional application No. 61/122,504, filed on Dec. 15, 2008.

(51) Int. Cl.
| | |
|---|---|
| C08G 63/02 | (2006.01) |
| C08G 63/189 | (2006.01) |
| B32B 1/00 | (2006.01) |
| B32B 1/08 | (2006.01) |
| B65D 1/02 | (2006.01) |
| C08K 5/49 | (2006.01) |
| C08K 5/51 | (2006.01) |

(52) U.S. Cl. ........ 528/272; 528/487; 524/115; 524/132; 521/182; 525/327.7; 428/35.5; 428/34.1; 428/36.92; 206/524.6

(58) Field of Classification Search .................. 528/272, 528/487; 524/115, 132; 521/182; 428/35.5, 428/34.1, 36.92; 206/524.6; 525/327.7
See application file for complete search history.

(56) References Cited

U.S. PATENT DOCUMENTS
6,531,548 B1    3/2003 Ng

FOREIGN PATENT DOCUMENTS
WO    9607687 A1    3/1996

OTHER PUBLICATIONS

Witt, Uwe et al., Synthesis, properties and biodegradability of polyesters based on 1,3-propanediol, Macromolecular Chemistry and Physics, 1994, pp. 793-802, vol. 195.
Jeong, Young Gyu et al., The effect of flexible chain length on thermal and mechanical properties of poly(m-methylene 2,6-naphthalate)s, Polymer, 2004, pp. 3321-3328, vol. 45.

*Primary Examiner* — Duc Truong (57) ABSTRACT

Polyester compositions based on 1,3-propanediol and aromatic and aliphatic diacids that can contain a large fraction of biologically derived content are disclosed. Transesterification between polyesters in blends of such compositions is greatly reduced using phosphorous-containing additives. The blends have properties similar to poly(ethylene terephthalate).

19 Claims, 2 Drawing Sheets

POLYESTER COMPOSITIONS FROM BIOLOGICALLY-DERIVED MATERIALS

FIELD OF DISCLOSURE

The present invention relates to polyester compositions based on 1,3-propanediol and aromatic and aliphatic diacids that can contain a large fraction of biologically derived content. Transesterification between polyesters in blends of such compositions is greatly reduced using phosphorous-containing additives.

BACKGROUND

Emerging environmental trends aimed at reducing greenhouse gas emissions, use of fossil carbon derivatives, and solid waste accumulation have created a growing desire to replace petroleum-based polyesters such as poly(ethylene terephthalate) ("PET") with renewably-sourced materials and modifiers, particularly for applications such as packaging. Current commercial offerings include, for example, poly (trimethylene terephthalate), polylactic acid, polyhydroxyalkanoates, starch, and poly(butylene adipate terephthalate). However, these products suffer from low thermal stability and inadequate mechanical properties for applications such as packaging.

Research aimed at producing polyesters that contain a high weight percentage of biologically derived material (high "green content") has focused on copolymerization, such as incorporation of biologically derived aliphatic moieties in place of part of the terephthalic acid in polytrimethylene terephthalate polymers [see, e.g., U. Witt et al., *Macromolecular Chemistry and Physics*, 195, 793-802 (1994)]. However, percent crystallinity, glass transition temperature, and melting temperature all decrease as a result, preventing the use of such materials in applications for which poly(ethylene terephthalate) is used.

Therefore, there remains a need to produce a polyester material that has a high enough glass transition temperature for applications such as packaging and contains a desirably large fraction of biologically derived material. The compositions disclosed herein enable the production of materials having both a green content higher than 40 wt % and acceptably high glass transition temperatures. Articles comprising these compositions are also provided.

SUMMARY

A composition is provided comprising:
(a) a resin comprising a phase-separated, physical blend of:
  (i) from about 1 to about 99 wt % of a first polyester component selected from the group consisting of:
    poly(trimethylene-2,6-naphthalate);
    at least one polyester based on 1,3-propanediol, 2,6-naphthalene dicarboxylic acid or acid equivalent, and at least one $C_4$ to $C_{12}$ aliphatic dicarboxylic acid or acid equivalent, in a molar ratio of 50:45-47:3-5; and mixtures thereof; and
  (ii) from about 99 to 1 wt % of a second polyester component, which is at least one polyester based on 1,3-propanediol, terephthalic acid or acid equivalent, and at least one $C_4$ to $C_{12}$ aliphatic dicarboxylic acid or acid equivalent in a molar ratio of 50:40-25:10-25; and
(b) a phosphorus-containing stabilizer at a concentration of about 0.3 to about 1 wt % based on the combined weight of the resin and the phosphorus-containing stabilizer,
wherein a differential scanning calorimetry (DSC) scan of the composition shows multiple glass transition temperatures ($T_g$), each $T_g$ being characteristic of the individual polyester components of the composition, as compared to miscible blends which exhibit a single, composition-dependent $T_g$.

In a further embodiment, a process is provided for preparing such compositions wherein the phosphorus-containing stabilizer (b) is a phosphite, comprising drying about 90 to about 95 wt % of the resin component (a), intimately mixing resin component (a) and the phosphite, and subjecting the mixture to a melt compounding process utilizing any known intensive mixing process.

DETAILED DESCRIPTION

Except where expressly noted, trademarks are shown in upper case.

Unless stated otherwise, all percentages, parts, ratios, etc., are by weight.

In the context of this disclosure, a number of terms shall be utilized.

As used herein, the term "phase-separated" describes a mixture of polymers for which a differential scanning calorimetry (DSC) scan of the composition shows multiple glass transition temperatures ($T_g$), each $T_g$ being characteristic of the individual polymer components of the blend, as compared to miscible blends which exhibit a single, composition-dependent $T_g$.

As used herein the term "physical blend" indicates a mixture in which little or no chemical reaction occurs between components of the blend.

As used herein, the term "aliphatic dicarboxylic acid" means a compound described by the formula wherein R is a divalent group that contains no aromatic rings.

As used herein, the term "$C_x$ aliphatic dicarboxylic acid" means an aliphatic dicarboxylic acid as described above in which the R group contains x-2 carbon atoms.

As used herein, the term "terephthalic acid equivalent" means compounds that perform substantially like terephthalic acids in reaction with polymeric glycols and diols, as would be generally recognized by a person of ordinary skill in the relevant art. Terephthalic acid equivalents for the purpose of the present disclosure include, for example, esters (such as dimethyl terephthalate), and ester-forming derivatives such as acid halides (e.g., acid chlorides) and anhydrides. "2,6-naphthalene dicarboxylic acid equivalent" and "aliphatic dicarboxylic acid equivalent" are defined analogously.

As used herein, the term "green content" means the proportion of a composition that is biologically derived.

As used herein, the term "(co)extrusion" encompasses both extrusion and co-extrusion.

1,3-Propanediol-2,6-naphthalenedicarboxylic acid-aliphatic dicarboxylic acid copolyester compositions ("3GNX")

In one embodiment, a polyester composition, herein referred to as "3GNX," is provided based on 1,3-propanediol; 2,6-naphthalene dicarboxylic acid or acid equivalent; and at least one $C_4$ to $C_{18}$ aliphatic dicarboxylic acid or acid equivalent in a molar ratio of 50:49.5-0.5:0.5-49.5.

In one embodiment, the 3GNX compositions found herein may be generally represented by Formula I:

wherein R is a $C_2$ to $C_{16}$ divalent group that contains no aromatic rings and n is in the range of from about 0.5 to about 49.5. In one embodiment, R is a $C_2$ to $C_8$ divalent group that contains no aromatic rings and consists of hydrogen and carbon.

The composition is made by polycondensation of 2,6-naphthalene dicarboxylic acid or acid equivalent, at least one $C_4$ to $C_{18}$ aliphatic dicarboxylic acid or acid equivalent, and 1,3-propanediol, with the 1,3-propane diol preferably being of the type that is obtained biochemically from a renewable source ("biologically-derived" 1,3-propanediol). A mixture of $C_4$ to $C_{18}$ aliphatic dicarboxylic acids or acid equivalents may be used. The polycondensation is carried out using conventional means, for example, as described in U. Witt et al., *Macromolecular Chemistry and Physics*, 195, 793-802 (1994) for the preparation of polyesters based on terephthalic acid or acid equivalent, 1,3-propanediol, and aliphatic dicarboxylic acid or acid equivalent. Alternatively, the composition may be prepared by transesterification of 3GN with at least one $C_4$ to $C_{18}$ aliphatic dicarboxylic acid or acid equivalent.

Examples of suitable aliphatic dicarboxylic acids and acid equivalents include but are not limited to: succinic acid, succinic anhydride, dimethyl succinate, 2-methylsuccinic acid, sebacic acid, glutaric acid, dimethyl glutarate, adipic acid, azelaic acid, 3-hexenedioic acid, pimelic acid, suberic acid, 1,4-cyclohexanedicarboxylic acid, 1,3-cyclohexanedicarboxylic acid, 1,4-cyclohexanediacetic acid, 1,3-cyclohexanediacetic acid, undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, and mixtures thereof. Many suitable aliphatic dicarboxylic acids and acid equivalents are biologically derived, and use of such biologically derived compounds is preferred. Some examples are presented in Table 1.

TABLE 1

| $C_4$ to $C_{12}$ aliphatic dicarboxylic acid or acid equivalent | Example of Biological Derivation |
|---|---|
| succinic acid | byproduct of the fermentation of sugar |
| sebacic acid | derivative of castor oil |
| adipic acid | oxidation of various fats |
| azelaic acid | found naturally in wheat, rye, and barley; produced by the yeast |

TABLE 1-continued

| $C_4$ to $C_{12}$ aliphatic dicarboxylic acid or acid equivalent | Example of Biological Derivation |
|---|---|
| | *Malassezia furfur* (also known as *Pityrosporum ovale*). |
| 1,12-dodecanedioic acid | biooxidation of fatty acid distillates of coconut oil and palm kernel oil |

Phase-Separated Blend Compositions

In a second embodiment, a composition is provided comprising:
(a) a resin comprising a phase-separated, physical blend of:
  (i) from about 1 to about 99 wt % of a first polyester component selected from the group consisting of:
    poly(trimethylene-2,6-naphthalate);
    at least one polyester based on 1,3-propanediol, 2,6-naphthalene dicarboxylic acid or acid equivalent, and at least one $C_4$ to $C_{12}$ aliphatic dicarboxylic acid or acid equivalent, in a molar ratio of 50:45-47:3-5; and
    mixtures thereof; and
  (ii) from about 99 to 1 wt % of a second polyester component, which is at least one polyester based on 1,3-propanediol, terephthalic acid or acid equivalent, and at least one $C_4$ to $C_{12}$ aliphatic dicarboxylic acid or acid equivalent in a molar ratio of 50:40-25:10-25; and
(b) a phosphorus-containing stabilizer at a concentration of about 0.3 to about 1 wt % based on the combined weight of the resin and the phosphorus-containing stabilizer,
wherein a differential scanning calorimetry (DSC) scan of the composition shows multiple glass transition temperatures ($T_g$), each $T_g$ being characteristic of the individual polyester components of the composition, as compared to miscible blends which exhibit a single, composition-dependent $T_g$.

Polyester Components

Poly(trimethylene-2,6-naphthalate) ("3GN") can be prepared by transesterification of a dialkyl ester of 2,6-naphthalene dicarboxylic acid and 1,3-propanediol or by direct esterification of 2,6-naphthalene dicarboxylic acid and 1,3-propanediol followed by polycondensation, as described in U.S. Pat. No. 6,531,548.

Polyesters based on 1,3-propanediol, 2,6-naphthalene dicarboxylic acid or acid equivalent, and at least one $C_4$ to $C_{12}$ aliphatic dicarboxylic acid or acid equivalent, in a molar ratio of 50:45-47:3-5 (i.e., the composition of Formula I wherein n=3-5) can be prepared as described above for 3GNX copolyesters generally, with the proviso that n is about 3 to about 5 and R is a $C_2$ to $C_{10}$ divalent group that contains no aromatic rings and consists of hydrogen and carbon.

The at least one polyester based on 1,3-propanediol, terephthalic acid, and at least one $C_4$ to $C_{12}$ aliphatic dicarboxylic acid or acid equivalent in a molar ratio of 50:40-25:10-25, herein referred to as "3GTX'" may be generally represented by Formula II:

wherein n is about 10 to about 25 and R is a $C_2$ to $C_{10}$ divalent group that contains no aromatic rings and consists of hydrogen and carbon.

Examples of suitable $C_4$ to $C_{12}$ aliphatic dicarboxylic acids and acid equivalents include but are not limited to: succinic acid, succinic anhydride, dimethyl succinate, 2-methylsuccinic acid, sebacic acid, glutaric acid, dimethyl glutarate, adipic acid, azelaic acid, 3-hexenedioic acid, pimelic acid, suberic acid, 1,4-cyclohexanedicarboxylic acid, 1,3-cyclohexanedicarboxylic acid, 1,4-cyclohexanediacetic acid, 1,3-cyclohexanediacetic acid, undecanedioic acid, 1,12-dodecanedioic acid, and mixtures thereof. The at least one aliphatic dicarboxylic acid or acid equivalent used to make 3GTX' may, but need not be, the same as the least one aliphatic dicarboxylic acid or acid equivalent used to make 3GNX in the compositions described herein.

The polymers described by Formula II may be prepared by polycondensation of the 1,3-propanediol, terephthalic acid, and at least one $C_4$ to $C_{12}$ aliphatic dicarboxylic acid or acid equivalent, as described by, for example, U. Witt et al., in *Macromolecular Chemistry and Physics*, 195, 793-802 (1994).

The 1,3-propanediol for use in making the compositions described herein is preferably obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella, Citrobacter, Clostridium*, and *Lactobacillus*. The technique is disclosed in several publications U.S. Pat. No. 5,633,362, U.S. Pat. No. 5,686,276 and U.S. Pat. No. 5,821,092. U.S. Pat. No. 5,821,092 herein incorporated by reference that discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol preferred for use in the context of the present invention contains renewable carbon, and not fossil fuel-based or petroleum-based carbon. The polytrimethylene terephthalate based thereon utilizing the biologically-derived 1,3-propanediol, therefore, has less impact on the environment as the 1,3-propanediol used does not deplete diminishing fossil fuels and, upon degradation, releases carbon back to the atmosphere for use by plants once again. Thus, the compositions of the present invention can be characterized as more natural and having less environmental impact than similar compositions comprising petroleum based diols.

The biologically-derived 1,3-propanediol, poly(trimethylene terephthalate) ("3GT"), and poly(trimethylene terephthalate) copolymers based thereon, may be distinguished from similar compounds produced from a petrochemical source or from fossil fuel carbon by dual carbon-isotopic finger printing. This method usefully distinguishes chemically-identical materials, and apportions carbon material by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship:

$$t=(-5730/0.693)\ln(A/A_0)$$

wherein t=age, 5730 years is the half-life of radiocarbon, and A and $A_0$ are the specific $^{14}C$ activity of the sample and of the modern standard, respectively (Hsieh, Y., *Soil Sci. Soc. Am J.*, 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere (plant material), $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. -10 to -14 per mil ($C_4$) and -21 to -26 per mil ($C_3$) (Weber et al., *J. Agric. Food Chem.*, 45, 2942 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000\text{‰}$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be completely distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as a reactant or as a component of the reactant in making poly(trimethylene terephthalate) ("3GT") and poly(trimethylene terephthalate) copolymers will have a purity of greater than about 99%, and more preferably greater than about 99.9%, by weight as determined by gas chromatographic analysis. Particularly preferred are the purified 1,3-propanediols as disclosed in U.S. Pat. No. 7,038,092, U.S. Pat. No. 7,098,368, U.S. Pat. No. 7,084,311 and US20050069997A1 that are herein incorporated by reference.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having a CIELAB "b*" color value of less than about 0.15 (ASTM D6290), and an absorbance at 270 nm of less than about 0.075; and/or

(3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

Phosphorus-Containing Stabilizers

The blend compositions described herein include a phosphorous-containing stabilizer which prevents transesterification at the high temperatures at which the two polyester components are melt blended. The stabilizer is typically added as an organophosphite, such as a trivalent arylphosphite, which under humid conditions is converted to a phosphate. Examples include but are not limited to bis(2,4-di-tert-butylphenyl) pentaerythritol diphosphite [CAS Registry Number 26741-53-7] and tris(alkylphenyl) phosphites (for example, tris(nonylphenyl) phosphite, tris-(2,4-di-t-butylphenyl) phosphite, and tris-(2,4 di-t-butyl-6-methyl-phenyl) phosphite.

The stabilizer can also be added as a phosphate, including but not limited to bis[2-[2-(2-hydroxyethoxy)ethoxy]ethyl] hydroxymethylphosphonate (CAS Registry Number 15395-27-4):

Other Ingredients

Depending on the intended end use of the material (for example, film, fiber, molded parts), other ingredients may also be present in the compositions described herein, particularly those that are commonly added to thermoplastic compositions. Such ingredients include, but are not limited to, delusterants (such as $TiO_2$, zinc sulfide or zinc oxide), colorants (such as dyes), pigments, fillers (for example, nanoclays such as montmorillonite and sepiolite), lubricant, mold release, flame retardants, (paint) adhesion promoters, epoxy compounds, crystallization nucleation agents, plasticizers, antimicrobial agents, antistatic agents, optical brighteners, extenders, processing aids, heat stabilizers, UV stabilizers, slip agents, antiblock agents, and other functional additives (e.g., "chip additives"). The compositions described herein may also be blended with other polymers, such as polyamides or polycarbonates.

$TiO_2$ or similar compounds (such as zinc sulfide and zinc oxide) are used as pigments or delusterants in amounts up to about 5 wt % or more (based on total composition weight) in fibers and larger amounts in some other end uses. When used in polymer for fibers and films, $TiO_2$ is added in an amount of preferably at least about 0.01 wt %, more preferably at least about 0.02 wt %, and preferably up to about 5 wt %, more preferably up to about 3 wt %, and most preferably up to about 2 wt % (based on total composition weight).

By "pigment" reference is made to those substances commonly referred to as pigments in the art. Pigments are substances, usually in the form of a dry powder, that impart color to the polymer or article. Pigments can be inorganic or organic, and can be natural or synthetic.

The other ingredients may be added to the compositions described herein by conventional blending techniques well known to those skilled in the art, e.g. compounding in a polymer extruder, melt blending, liquid injection, etc.

Blend Preparation

The blend compositions of the invention may be prepared by conventional blending techniques well known to those skilled in the art. Usually, the polyester components are dried before processing. The drying conditions are determined by the specific polyesters used and the specific phosphorus-containing stabilizer and are reading determined by one of ordinary skill in the art. One typical set of conditions is to dry the polyesters at 100-120° C. for 16 hours under vacuum with a small nitrogen flow. When a phosphite stabilizer is used, only about 90 to about 95 wt % of the resin component (a) is dried; that is, about 5 to 10 wt % of the resin component (a) is left undried in order to provide a suitable humidity during processing to convert the phosphite to phosphate.

The mixture is heated at a temperature sufficient to form a melt blend. The temperature should be above the melting points of each component but below the lowest decomposition temperature, and accordingly must be adjusted for any particular polyester components and phosphorous-containing stabilizer. The temperature is typically in the range of about 220° C. to about 270° C.

A melt compounding process is used to prepare the blends, utilizing any known intensive mixing process, such as mixing in a HAAKE Rheocord Mixer (available from Thermo Fisher Scientific Inc., Waltham, Mass., USA) or Brabender® mixer (available from (C. W. Brabender® Instruments, Inc., South Hackensack, N.J., USA) or extrusion through a twin screw extruder. Preferably, a twin screw extruder is used. The resin component (a) and phosphorous-containing stabilizer (b) are intimately mixed and fed to the mixer or extruder. Desired other ingredients may be part of the intimate mixture or may be co-fed or added at separate stages during the compounding or in a subsequent step. For example, pellets may be formed by extruding containing only the polyester components and phosphorous-containing stabilizer, and the pellets may be compounded with other ingredients in a separate step. The blends may be extruded or co-extruded into film, spun into fibers, or formed into shaped articles in a continuous manner following melt compounding or in a separate step.

Figure 1:
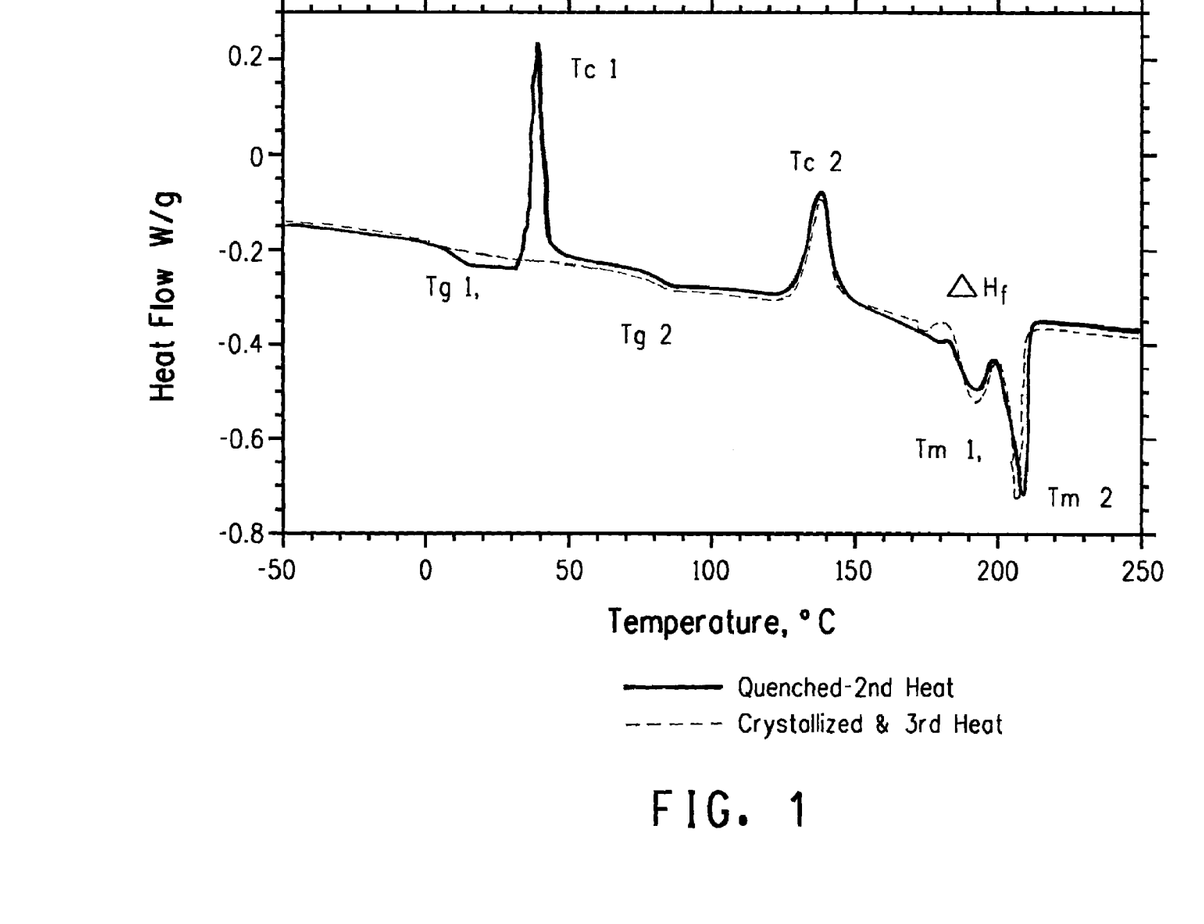
FIG. 1 illustrates a DSC scan for a phase-separated blend composition.

The blend compositions so prepared are demonstrably phase-separated, in that a differential scanning calorimetry (DSC) scan of the composition shows multiple glass transition temperatures ($T_g$), each $T_g$ being characteristic of the individual polyester components of the composition, as compared to miscible blends which exhibit a single, composition-dependent $T_g$. The $T_g$'s typically lie in the range of about 76° C. to 83° C. The blends also exhibit individual cold crystallization temperatures and melting temperatures characteristic of the individual polyester components. FIG. 1, for example, includes typical DSC scans for a phase-separated blend composition. In this instance, the composition is a 50:49.55:0.45 parts by weight blend of 3GN, the copolyester 3G/T/Sebacate, molar ratio 50:37.5:12.5, to which 1.5 wt % Gelwhite L® montmorillonite clay had been added during polymerization, and 0.45 Ultranox® 626A [bis(2,4-di-tert-butylphenyl) pentaerythritol diphosphite, CAS Registry Number 26741-53-7]. The continuous trace is that of the sample during re-heating after quenching to an amorphous state. Distinct component transition temperatures, indicative of two distinct phases, are clearly shown as $T_{g1}$ (5.13° C.), $T_{c1}$ (36.26° C.) $T_{m1}$ (178° C.), $T_{g2}$ (80.4° C.), $T_{c2}$ (136.8° C.), and $T_{m2}$ (207° C.). The heat of fusion, $\Delta H_f$, is 35.26 J/g. The DSC results also show a large processing window for biaxial stretching of cast film, indicated by the temperature interval from the higher of the two glass transition temperatures $T_g$ to the higher of the two cold crystallization temperatures $T_c$, here, from $T_{g2}$ to $T_{c2}$. The dotted line is the trace obtained during a third heat of the sample. Other than the disappearance of the $T_{c1}$ transition, since that component has been crystallized, there is essentially no change in the results, indicating that the composition remains phase-separated with repeated heating.

Figure 2:
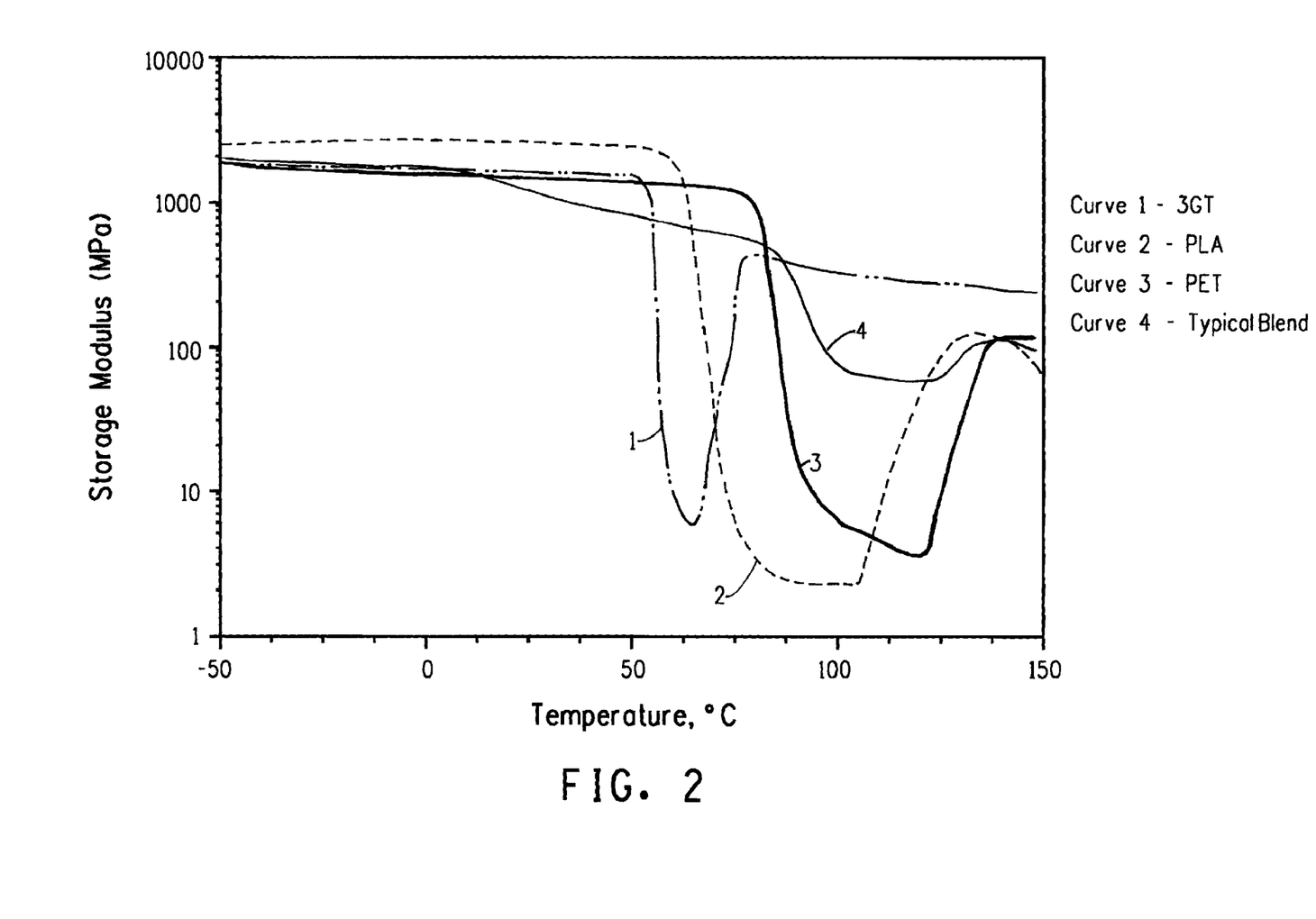
FIG. 2 illustrates a storage modulus curve.

Films prepared from the blends described herein exhibit low shrinkage at 100° F. (37.7° C.), high Vicat softening temperatures, good heat seal strength above 250° F. (121° C.), and elongation at break as high as 213%. As shown in FIG. 2, storage modulus is retained to a greater extent at increased temperature than typical commercial polyesters, such as PET, poly(lactic acid) ("PLA") and 3GT. This is important for dimensional stability. They also exhibit a sufficiently large processing window for biaxial stretching of cast film, indicated by the temperature interval from the higher of the two $T_g$'s to the higher of the two cold crystallization temperatures ($T_c$). In general, the blends exhibit PET-like mechanical properties and can exhibit lower oxygen permeability than PET, depending on the specific composition, while comprising a green content of over 40%.

Uses

The compositions described herein may be used in fibers, fabrics, films and other useful articles. Articles described herein may be in the form of or comprise, but are not limited to, film, sheet, container, membrane, laminate, pellet, coating, foam, fiber, yarn, or fabric. In one embodiment, the article is a biaxially oriented film. In another embodiment, the article is an injection stretch blow molded bottle.

Articles may be prepared by any means known in the art, such as, but not limited to, methods of injection molding, (co)extrusion, film blowing, (co)extrusion, blow molding, injection stretch blow molding, thermoforming, solution casting, lamination, knitting, weaving, spinning, or any combination of these methods.

Film, sheet, and containers comprising the compositions described herein exhibit mechanical and thermal properties similar to poly(ethylene terephthalate) but have at least 40% green content and exhibit lower oxygen.

In some embodiments, articles of the present invention include packaging for food, personal care (health and hygiene) items, and cosmetics. By "packaging" is meant either an entire package or a component of a package. Examples of packaging components include, but are not limited, to packaging film, liners, shrink bags, shrink wrap, trays, tray/container assemblies, replaceable and nonreplaceable caps, lids, and drink bottle necks.

The package may be in any form appropriate for the particular application, such as a can, box, bottle, jar, bag, cosmetics package, or closed-ended tube. The packaging may be fashioned by any means known in the art, such as, but not limited to, extrusion, coextrusion, thermoforming, injection molding, lamination, or blow molding.

Some specific examples of packaging for personal care items and cosmetics include, but are not limited to, bottles, jars, and caps for food and for prescription and non-prescription capsules and pills; solutions, creams, lotions, powders, shampoos, conditioners, deodorants, antiperspirants, and suspensions for eye, ear, nose, throat, vaginal, urinary tract, rectal, skin, and hair contact; and lip product.

The compositions disclosed herein may also be used, for example, for producing continuous and cut (e.g., staple) fibers, yarns, and knitted, woven and nonwoven textiles. The fibers may be monocomponent fibers or multicomponent (e.g., bicomponent) fibers, and may have many different shapes and forms. They are useful for textiles and flooring, including carpets, such as disclosed in U.S. Pat. No. 7,013,628.

EXAMPLES

In the following examples, all parts, percentages, etc., are by weight unless otherwise indicated.
Ingredients Monomers were obtained from Aldrich Chemical Company, Inc (Milwaukee, Wis., USA).

Poly(trimethylene-2,6-naphthalate) was obtained from DuPont Canada (Kingston, Ontario, Canada).

Tyzor® titanium(IV) isopropoxide ("TPT") catalyst was obtained from E.I. du Pont de Nemours & Co., Inc. (Wilmington, Del., USA).

Pangel® S-9 sepiolite clay was purchased from EM Sullivan Associates, Inc. (Paoli, Pa., USA), a distributor for the manufacturer, Tolsa S.A. (Madrid 28001, Spain). Pangel® S-9 is not organically modified.

Gelwhite L® is a highly purified montmorillonite clay obtained from Southern Clay Products, Inc. (Gonzales, Tex., USA).

Ultranox® 626A [bis(2,4-di-tert-butylphenyl)pentaerythritol diphosphite, CAS Registry Number 26741-53-7] was obtained from Crompton Corporation (Middlebury, Conn., USA).
Polymer Syntheses Polymer 1D: To a 250 mL glass flask were added the monomers and listed in the table below. The reaction mixture was stirred while the vessel was evacuated by vacuum to 30 in Hg (762 torr) and brought back to atmospheric pressure under nitrogen 3 times. With continuous stirring under the nitrogen atmosphere, the reaction mixture was first heated to 160° C. over 10 minutes and then to 210° C. over an additional 50 minutes. The reaction mixture was held at this temperature under the nitrogen atmosphere with continuous stirring for 30 minutes. The reaction mixture was then heated to 250° C. over 30 minutes and held at this temperature for 1.5 hours while distillate was collected. The reaction vessel was then staged to full vacuum (60 mtorr) over the course of 30 minutes with continuous stirring at 250° C. The vessel was held under these conditions for a further 3 hours while additional distillate was collected. Vacuum was then released with nitrogen, and the reaction mixture was allowed to return to room temperature.

For polymers 1A, 1B, 1C, and 1E, the above process was scaled up using a 25 gallon autoclave. The esterification step took place in a still at 245° C. over 3 to 3.5 hours until no more water generated, which was removed as a liquid condensate by distillation. After evolution of water had ceased, the resulting content was transferred to a different clave and polymerized at a temperature of 250° C. and a pressure of 0.5 Torr for 4.5 to 6.5 hours. The obtained polymer was cast into ribbons and cut into pellets.
Test Methods The intrinsic viscosity (IV) of polymer samples was determined using a Viscotek Forced Flow Viscometer (FFV) Model Y-900. Samples are dissolved in 50/50 wt % trifluoroacetic acid/methylene chloride (TFA/CH2Cl2) at a 0.4% (wt/vol) concentration at 19° C.

The compositions of the polymers were determined by Nuclear Magnetic Resonance spectroscopy (NMR). Several pellets or flakes for each sample were dissolved in trifluoroacetic acid-d1 at room temp (one can also heat the sample to 50° C. with out seeing any structural changes in order to speed up dissolution). The samples were dissolved in a 10 mm NMR tube and enough solvent was added to totally dissolve the sample. They were then placed in a 5 mm NMR tubes and their NMR spectra were run at 30° C. on a Varian S 400 MHz Spectrometer. Mole-% composition of the sample was determined from integration of appropriate areas of the spectrum.

Differential Scanning Calorimetry (DSC) was performed on a TA Instruments model number 2920 machine under a nitrogen atmosphere, to determine $T_g$, $T_c$, $T_m$, and $\Delta H_f$. Samples were heated from 20° C. to 270° C. at 20° C./min, held at 270° C. for 5 min, quenched in liquid $N_2$, heated from −100° C. to 270° C. at 10° C./min ($T_g$), held at 270° C. for 3 min, cooled to −100° C. at 10° C./min ($T_c$), held at −100° C. for 2 min, and heated from −100° to 270° C. at 10° C./min ($T_c$ and $T_m$).

Oxygen permeation values (OPV) were determined according to ASTM procedure D3985 at 38° C. and the indicated relative humidity on an OX-TRAN® Model 2/61 instrument (MOCON Inc., Minneapolis, Minn., USA).

The tensile properties of film samples were determined according to ASTM procedure D882.
Film Preparation All samples were dried at 100-120° C. for 16 hours before running in extruder.

Pellet mixtures were loaded into the twin screw extruder, a DSM Micro 15 Twin Screw Compounder (200-245V, 50-56 Hz, 2500 watt, 11.5 amp, DSM Research, Netherlands). The loading tube was purged with dry nitrogen to minimize degradation. The melt zone temperature was set 30° C. above the polymer melting point. For polymer blends, the melting temperature was set 30° C. above the melting point of the blend component having the highest melting point. The polymers were mixed for 3-4 minutes at 200 rpm. The extruder was purged 4 times with a particular sample to remove traces of previous samples. The fifth loading of a sample was kept for analysis. Molten polymer was delivered to a 0.4 mm film die. The film then passed to a chilled roller for casting and then was wound on a take-up roll. An air knife was placed between the die and the chilled roller to help cool the film. Films were 8-12 mil (0.20-0.30 mm) thick, about 3 cm wide, and at least 3 feet (0.91 m) long.

Example 1

Preparation of 3GTX and 3GNX Polyesters

Using the above polymerization procedures, polyesters were prepared using the monomer masses listed in Table 2 and titanium(IV) isopropoxide (TPT) catalyst (equivalent to 50 ppm Ti). Analytical results are presented in Table 3.

TABLE 2

| Polyester | 1A | 1B | 1C | 1D | 1E |
|---|---|---|---|---|---|
| Composition (molar ratio) | 3G/T/Suc (50:32.5:17.5) | 3G/T/Seb (50:32.5:17.5) | 3G/T/Seb (50:37.5:12.5) | 3G/2,6N/Seb (50:46.5:3.5) | 3G/T/Adi (50:32.5:17.5) |
| 1,3-Propanediol | 30.8 kg | 30.8 kg | 28.6 kg | 38.75 g | 30.8 kg |
| Terephthalic acid (g) | 27.7 kg | 27.7 kg | 29.5 kg | — | 27.7 kg |
| Succinic anhydride (g) | 9.07 kg | — | — | — | — |
| Sebacic acid (g) | — | 32.2 kg | 12.0 kg | — | — |
| Dimethyl-2,6-naphthalenedicarboxylate | — | — | — | 88.98 g | — |
| Dimethyl sebacate | — | — | — | 6.32 g | — |
| Adipic acid (c) | — | — | — | — | 13.2 kg |
| Tyzor ® TPT | 15 g | 15 g | 15 g | 0.03 g | 15 g |

TABLE 3

| | IV | | DSC Results | | ΔHf |
|---|---|---|---|---|---|
| Polymer | (dL/g) | Tg (° C.) | Tc (° C) | Tm(° C.) | (J/g) |
| 1A | 0.81 | 11.3 | 48.7 | 170.5 | 29.5 |
| 1B | 0.54 | −8.7 | 21 | 167.8 | 30.86 |
| 1C | 0.90 | 3.25 | 33 | 189 | 41.5 |
| 1D | 0.80 | 71.7 | 161 | 186 | 0.9 |
| 1E | 0.855 | 3.37 | 34.3 | 175.3 | 36.7 |

Examples 2-9

Polymer blends were melt compounded of the compositions shown in Table 4 using the procedure described above. All compositions additionally contained 0.4 wt % Ultranox® 626A. Mechanical and thermal properties are presented in Table 5. The presence of individual glass transition, crystallization, and melting temperatures associated with each of the two polyester components of each blend indicate that the blends were phase separated. Green content is calculated for the polyester blend without taking into account any clay additive present. Where clay was added (Gelwhite®L montmorillonite or Pangel® S-9 sepiolite), it was present at 0.7 wt %. Clay was melt compounded with the component polyesters and Ultranox® 626A except for Example 6A, in which it was added during the polymerization of 1C.

TABLE 4

| Example | First Polyester Component | Second Polyester Component | First Polyester: Second Polyester: Ultranox ® 626A (wt. ratio) | Green Content (wt %) | Clay Additive |
|---|---|---|---|---|---|
| 2 | 3GN | 1A | 50:49.6:0.4 | 42 | None |
| 3 | 3GN | 1A | 50:49.6:0.4 | 42 | montmorillonite |
| 4 | 3GN | 1C | 50:49.6:0.4 | 41.5 | None |
| 5 | 3GN | 1C | 50:49.6:0.4 | 42 | montmorillonite |
| 6 | 3GN | 1C | 50:49.6:0.4 | 42 | sepiolite |
| 6A* | 3GN | 1C | 50:49.6:0.4 | 42 | sepiolite |
| 7 | 3GN | 1C | 40:59.6:0.4 | 44 | None |
| 8 | 3GN | 1C | 40:59.6:0.4 | 44 | montmorillonite |
| 9 | 1D | 1C | 60:39.6:0.4 | 41 | None |

*In 6A, sepiolite was added during the polymerization.

TABLE 5

| Example | Modulus (MPa) | Tensile Strength (MPa) | Elongation at Break (%) | Tg1/Tg2 (° C.) | Tc1/Tc2 (° C.) | Tm1/Tm2 (° C.) | ΔHf (J/g) |
|---|---|---|---|---|---|---|---|
| 2 | 1043 | 40 | 125 | 13.8/81 | 54/137 | 171/204 | 32 |
| 3 | 1330 | 45 | 8 | 5.98/79.7 | 49/137 | 173/205 | 34 |
| 4 | 1323 | 46 | 203 | 23/68.9 | 70/123 | 183/203 | 33 |
| 5 | 1218 | 44 | 175 | 5.9/80.7 | 37/134 | 189/205 | 34 |
| 6 | 1169 | 43 | 85 | 7.5/79 | 37/135 | 189/205 | 35 |
| 6A* | 1290 | 46 | 213 | 5.8/78.7 | 38/134 | 191/207 | 34 |
| 7 | 1153 | 40 | 61 | 16.2/76 | 50/134 | 186/206 | 32 |

TABLE 5-continued

| Example | Modulus (MPa) | Tensile Strength (MPa) | Elongation at Break (%) | Tg1/Tg2 (° C.) | Tc1/Tc2 (° C.) | Tm1/Tm2 (° C.) | ΔHf (J/g) |
|---|---|---|---|---|---|---|---|
| 8 | 1198 | 43 | 40 | 8.7/79.5 | 40/135 | 188/205 | 35 |
| 9 | 1230 | 42 | 120 | 11.6/70 | 47/114 | 185/197 | 38 |

Example 10

Oxygen permeation values were determined as described above for cast films of several polyesters and two phase-separated blends of the invention at 38° C. at a variety of relative humidities. Results are presented in Table 6 along with green content.

TABLE 6

| Cast Film Composition | Green content (wt %) | Oxygen Permeation Values (cm³-mil/100 in²-24 h-atm) | | |
|---|---|---|---|---|
| | | RH = 0% | RH = 50% | RH = 85% |
| PET | 0 | 11.9 | 9.0 | 7.0 |
| 3GN | 29 | 3.10 | 2.72 | 2.25 |
| 3G/T/IPA (50/45/5 mol ratio)* | 37 | | 0.85 | |
| 1A | 55 | | 8 | 7.33 |
| 1E | 56 | | 15.78 | |
| 1C | 54 | | 30.0 | |
| Example 2 blend: 50 wt % 3GN/ 49.6 wt % 1A/ 0.4 wt % Ultranox ® 626A | 42 | | 5.07 | 5.7 |
| Example 3 blend: 50 wt % 3GN/ 49.6 wt % 1C/ 0.4% Ultranox ® 626A | 42 | | 8.64 | 8.9 |

*Polyester based on 1,3-propanediol ("3G"), terephthalic acid ("T") and isophthalic acid ("IPA")

Example 11

Films were prepared, as described above, of samples of poly(trimethylene terephthalate) ("3GT") and the phase separated blend prepared in Example 2, 50 wt % 3GN/49.6 wt % 1A/0.4 wt % Ultranox® 626A.

Attempts were made to heat seal the films. The 3GT film did not heat seal. The phase-separated blend film heat-sealed successfully, demonstrating a maximum load of 7.825 lb/inch (139.7 kg/m) in a peel test (Instron method CR-188,1" (2.54 cm) bar, at 275° F. (135° C.), 40 psi (276 kPa), with a 5 second dwell time followed by aging for one day at 23° C., 50% relative humidity).

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

What is claimed is:

1. A composition comprising:
   (a) a resin comprising a phase-separated, physical blend of:
      (i) from about 1 to about 99 wt % of a first polyester component selected from the group consisting of: poly(trimethylene-2,6-naphthalate);
         at least one polyester based on 1,3-propanediol, 2,6-naphthalene dicarboxylic acid or acid equivalent, and at least one $C_4$ to $C_{12}$ aliphatic dicarboxylic acid or acid equivalent, in a molar ratio of 50: 45-47: 3-5; and
         mixtures thereof; and
      (ii) from about 99 to 1 wt % of a second polyester component, which is at least one polyester based on 1,3-propanediol, terephthalic acid or acid equivalent, and at least one $C_4$ to $C_{12}$ aliphatic dicarboxylic acid or acid equivalent in a molar ratio of 50: 40-25: 10-25; and
   (b) a phosphorus-containing stabilizer at a concentration of about 0.3 to about 1 wt % based on the combined weight of the resin and the phosphorus-containing stabilizer, wherein a differential scanning calorimetry (DSC) scan of the composition shows multiple glass transition temperatures ($T_g$), each $T_g$ being characteristic of the individual polyester components of the composition.

2. The composition of claim 1, wherein the at least one $C_4$ to $C_{12}$ aliphatic dicarboxylic acid or acid equivalent is selected from the group consisting of succinic acid, succinic anhydride, dimethyl succinate, 2-methylsuccinic acid, sebacic acid, glutaric acid, dimethyl glutarate, adipic acid, azelaic acid, 3-hexenedioic acid, pimelic acid, suberic acid, 1,4-cyclohexanedicarboxylic acid, 1,3-cyclohexanedicarboxylic acid, 1,4-cyclohexanediacetic acid, 1,3-cyclohexanediacetic acid, undecanedioic acid, 1,12-dodecanedioic acid, and mixtures thereof.

3. The composition of claim 1, wherein the concentration of the phosphorus-containing stabilizer is from about 0.3 to about 1 weight percent, based on the weight of the resin plus phosphorus-containing stabilizer.

4. The composition of claim 3, wherein the phosphorus-containing stabilizer is selected from the group consisting of: bis(2,4-di-tert-butylphenyl) pentaerythritol diphosphite, tris (nonylphenyl) phosphate, tris-(2,4-di-t-butylphenyl) phosphite, tris-(2,4 di-t-butyl-6-methyl-phenyl) phosphite, and bis[2-[2-(2-hydroxyethoxy)ethoxy]ethyl] hydroxymethylphosphonate.

5. The composition of claim 1, wherein the 1,3-propanediol is biologically derived.

6. The composition of claim 1, wherein at least one $C_4$ to $C_{12}$ aliphatic dibasic acid is biologically derived.

7. An article of manufacture comprising the composition of claim 1.

8. The article of manufacture of claim 7 wherein said article is formed by methods of injection molding, (co)extrusion, film blowing, (co)extrusion, blow molding, injection stretch blow molding, thermoforming, solution casting, lamination, knitting, weaving, spinning, or any combination of these methods.

9. The article of manufacture of claim 7 wherein said article is a film, sheet, container, membrane, laminate, pellet, coating, foam, fiber, yarn, fabric, package or packaging component, bottle, box, jar, can, bag, close-ended tube, cosmetics package, liner, lid, replaceable or disposable container cap, shrink wrap, shrink bag, tray, tray/container assembly, or drink bottle neck.

10. The article of manufacture of claim 9 wherein said article is a film that is biaxially oriented.

11. The article of manufacture of claim 9 wherein said article is a bottle that is produced by injection stretch blow molding.

12. A process for preparing the composition of claim 1 wherein the phosphorus-containing stabilizer (b) is a phosphite, comprising drying about 90 to about 95 wt % of the resin component (a), intimately mixing resin component (a) and the phosphite, and subjecting the mixture to a melt compounding process utilizing any known intensive mixing process.

13. The composition of claim 1 wherein the $C_4$ to $C_{12}$ aliphatic dicarboxylic acid or acid equivalent in the second polyester component is succinic acid or succinic anhydride.

14. The composition of claim 1 wherein the first polyester component is poly(trimethylene-2,6-naphthalate).

15. The composition of claim 14 wherein the $C_4$ to $C_{12}$ aliphatic dicarboxylic acid or acid equivalent in the second polyester component is selected from the group consisting of succinic acid, succinic anhydride, dimethyl succinate, sebacic acid and adipic acid.

16. The composition of claim 14 wherein the $C_4$ to $C_{12}$ aliphatic dicarboxylic acid or acid equivalent in the second polyester component is succinic acid, succinic anhydride, or dimethyl succinate.

17. The composition of claim 1 wherein the first polyester component is a polyester based on 1,3-propanediol, 2,6-naphthalene dicarboxylic acid or acid equivalent, and at least one $C_4$ to $C_{12}$ aliphatic dicarboxylic acid or acid equivalent, in a molar ratio of 50: 45-47: 3-5.

18. The composition of claim 17 wherein the $C_4$ to $C_{12}$ aliphatic dicarboxylic acid or acid equivalent is selected from the group consisting of succinic acid, succinic anhydride, dimethyl succinate, 2-methylsuccinic acid, sebacic acid, glutaric acid, dimethyl glutarate, adipic acid, azelaic acid, 3-hexenedioic acid, pimelic acid, suberic acid, 1,4-cyclohexanedicarboxylic acid, 1,3-cyclohexanedicarboxylic acid, 1,4-cyclohexanediacetic acid, 1,3-cyclohexanediacetic acid, undecanedioic acid, 1,12 dodecanedioic acid, and mixtures thereof.

19. The composition of claim 18 wherein the $C_4$ to $C_{12}$ aliphatic dicarboxylic acid or acid equivalent is sebacic acid or dimethyl sebacate.

* * * * *